United States Patent
Duncan

(10) Patent No.: US 10,779,637 B2
(45) Date of Patent: Sep. 22, 2020

(54) ORAL CARE SYSTEM

(71) Applicant: COLGATE-PALMOLIVE COMPANY, New York, NY (US)

(72) Inventor: Kelly Gail Duncan, Washington, NJ (US)

(73) Assignee: Colgate-Palmolive Company, New York, NY (US)

( * ) Notice: Subject to any disclaimer, the term of this patent is extended or adjusted under 35 U.S.C. 154(b) by 818 days.

(21) Appl. No.: 15/313,576

(22) PCT Filed: May 29, 2014

(86) PCT No.: PCT/US2014/039916
§ 371 (c)(1),
(2) Date: Nov. 23, 2016

(87) PCT Pub. No.: WO2015/183271
PCT Pub. Date: Dec. 3, 2015

(65) Prior Publication Data
US 2017/0143110 A1 May 25, 2017

(51) Int. Cl.
| A46B 11/00 | (2006.01) |
| A46B 15/00 | (2006.01) |
| A61C 19/06 | (2006.01) |
| A46B 5/00  | (2006.01) |
| A45D 44/18 | (2006.01) |

(52) U.S. Cl.
CPC ........ *A46B 11/0058* (2013.01); *A46B 5/0016* (2013.01); *A46B 11/001* (2013.01);
(Continued)

(58) Field of Classification Search
CPC ..... A61C 15/046; A61C 15/041; A61C 15/04; A61C 15/048; A61C 15/00; A61C 5/85;
(Continued)

(56) References Cited

U.S. PATENT DOCUMENTS 1,485,519 A * 3/1924 Nelson ............... A46B 15/0071
132/309
1,537,853 A * 5/1925 Mason ............... A46B 15/0071
132/309
(Continued)

FOREIGN PATENT DOCUMENTS

| CN | 201414538 Y | 3/2010 |
| DE | 29920781    | 2/2000 |
| WO | WO 2004/056287 | 7/2004 |

OTHER PUBLICATIONS

International Search Report and the Written Opinion of the International Searching Authority issued in international application PCT/US2014/039916 dated Aug. 5, 2014.

*Primary Examiner* — Tatiana L Nobrega

(57) ABSTRACT

An oral care system includes a handle and a head, the handle having a proximal end and a distal end, the head being coupled to the distal end of the handle and including at least one oral surface engaging element. The oral care system further includes a mechanism including first and second housing portions, each including a first and a second end; and an applicator loaded with an oral care material and positioned within the mechanism. The first ends of the first and second housing portions are pivotably coupled to one another about a rotational axis so as to be alterable between: (1) a closed state in which the first and second housing portions form an enclosure that contains the applicator; and (2) an open state in which the second ends of the first and second housing portions are spaced from one another and the applicator is exposed.

15 Claims, 9 Drawing Sheets

(52) U.S. Cl.
CPC .......... *A46B 15/0055* (2013.01); *A61C 19/06* (2013.01); *A61C 19/066* (2013.01); *A45D 44/18* (2013.01); *A46B 2200/1046* (2013.01); *A46B 2200/1066* (2013.01)

(58) Field of Classification Search
CPC .... A61C 5/88; A61C 3/12; A61C 3/06; A61C 19/066; A61C 19/063; A45D 44/18; A46B 11/00; A46B 11/001; A46B 11/0013; A46B 11/002; A46B 11/0058; A46B 11/0062; A46B 15/0081; A46B 15/0071; A46B 15/0073; A46B 15/0061; A46B 15/0055; A46B 2200/1066; A46B 2200/10; A46B 5/0016
USPC .......... 132/309, 323, 326, 327; 15/184, 185, 15/212, 213, 233; 401/37, 39; 433/148, 433/149, 146, 147, 142
See application file for complete search history.

(56) References Cited

U.S. PATENT DOCUMENTS

| | | | |
|---|---|---|---|
| 3,534,745 A | | 10/1970 | Waters |
| 3,811,447 A | | 5/1974 | Weber |
| 4,004,597 A | | 1/1977 | Kupperman et al. |
| 4,019,522 A | * | 4/1977 | Elbreder .............. A61C 15/043 132/322 |
| 4,542,828 A | * | 9/1985 | Gotto .................... A45D 27/22 132/308 |
| 4,832,062 A | * | 5/1989 | Grollimund ......... A61C 15/046 132/324 |
| 5,010,906 A | | 4/1991 | Preciutti |
| 5,197,498 A | * | 3/1993 | Stewart ................ A61C 15/046 132/323 |
| 5,392,795 A | * | 2/1995 | Gathani ............. A46B 15/0071 132/321 |
| 5,415,187 A | * | 5/1995 | Heneveld ............. A46B 5/0095 132/324 |
| 6,671,920 B2 | | 1/2004 | Pearlman et al. |
| 7,455,521 B2 | | 11/2008 | Fishburne, Jr. |
| 8,635,731 B2 | | 1/2014 | Garner et al. |
| 2007/0009857 A1 | | 1/2007 | Philp, Jr. et al. |
| 2007/0010848 A1 | * | 1/2007 | Leung ................ A61B 17/8858 606/198 |
| 2013/0004912 A1 | | 1/2013 | Brown et al. |
| 2013/0061413 A1 | | 3/2013 | Li |
| 2015/0053233 A1 | * | 2/2015 | Lim ................... A46B 15/0055 132/218 |
| 2015/0272312 A1 | | 10/2015 | Boyke et al. |

\* cited by examiner

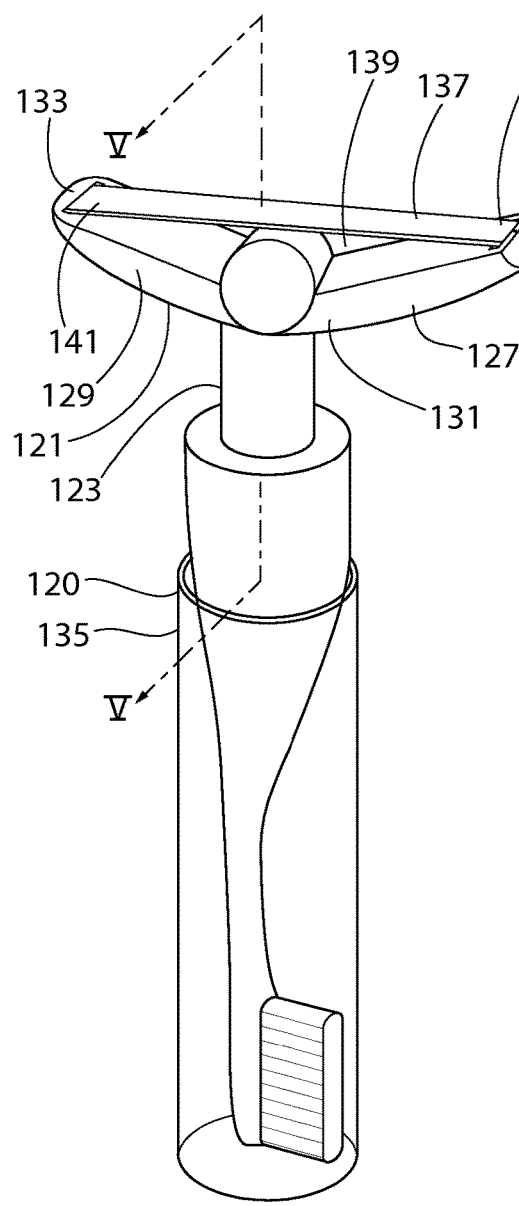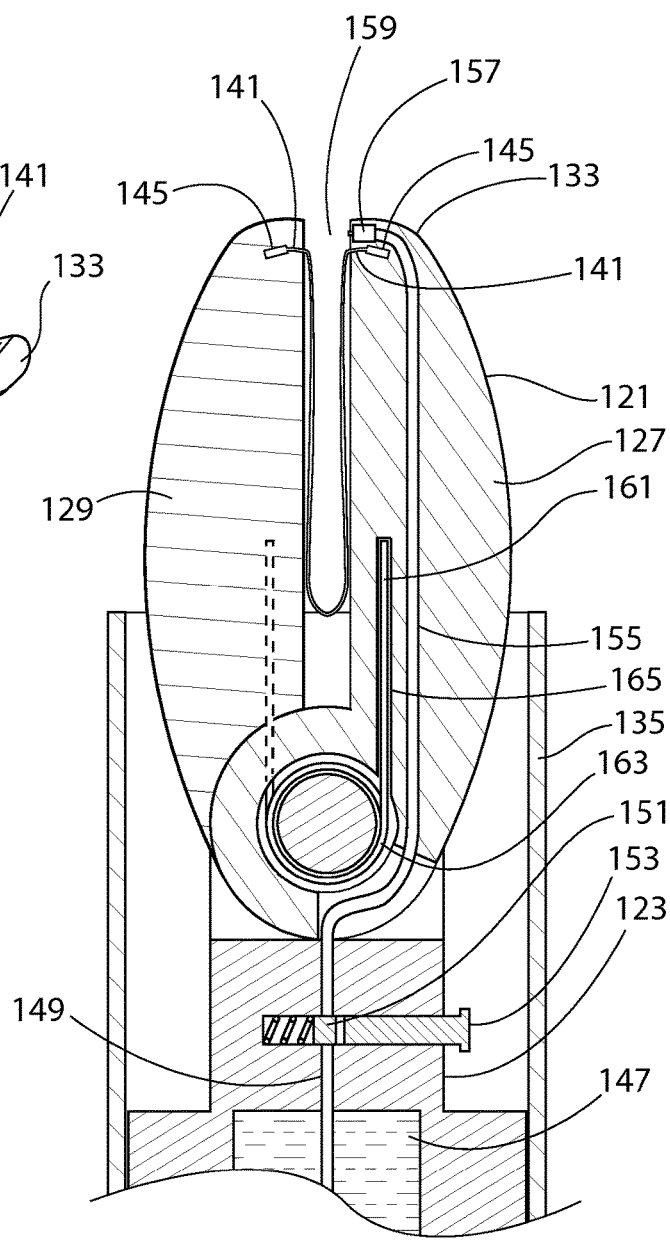
FIG. 3
FIG. 4

ORAL CARE SYSTEM

BACKGROUND

Oral care implements such as toothbrushes are typically used by applying dentifrice to a bristle section on the head of the toothbrush, followed by brushing regions of the oral cavity (e.g., the teeth or soft tissue such as the tongue and/or gums) with the bristle section. Furthermore, a growing cosmetic trend has been to supplement tooth brushing with the application of additional oral care materials to the user's oral cavity. However, conventional systems for applying oral care materials requires that the user maintain both a toothbrush and an additional kit for storing and dispensing the oral care material into the user's oral cavity. This not only requires extra storage space in already cramped bathroom cabinets, but also requires that the user remember to use the oral care material treatment system. Furthermore, these systems are not conveniently portable for transport and/or travel. Moreover, these known systems only apply the oral care agent onto a single tooth at a time, thereby resulting in the application of the oral care agent being a time consuming and ineffective process. These problems require a better way to deliver the oral care materials to the oral cavity and a more convenient oral care material application system for storage, transport and/or travel.

BRIEF SUMMARY

Exemplary embodiments according to the present disclosure are directed to an oral care system in which an oral care implement includes a head, a handle, and a mechanism having an applicator positioned therein.

In one aspect, the invention can be an oral care system comprising: a handle comprising a proximal end and a distal end; and a head coupled to a distal end of the handle, the head comprising at least one oral surface engaging element; the handle comprising: a mechanism comprising a first housing portion and a second housing portion, each of the first and second housing portions comprising a first end and a second end; and an applicator loaded with an oral care material, the applicator positioned within the mechanism; the first ends of the first and second housing portions are pivotably coupled to one another about a rotational axis so as to be alterable between: (1) a closed state in which the first and second housing portions form an mechanism that contains the applicator; and (2) an open state in which the second ends of the first and second housing portions are spaced from one another and the applicator is exposed.

In another aspect, the invention can be an oral care system comprising: a mechanism comprising a first housing portion and a second housing portion, each of the first and second housing portions comprising a first end and a second end; and an applicator loaded with an oral care material, the applicator positioned within the mechanism; the first ends of the first and second housing portions are pivotably coupled to one another about a rotational axis so as to be alterable between: (1) a closed state in which the first and second housing portions form an mechanism that contains the applicator; and (2) an open state in which the second ends of the first and second housing portions are spaced from one another and the applicator is exposed.

In yet another aspect, the invention can be an oral care system comprising: a head comprising at least one oral surface engaging element; a handle; a first housing portion and a second housing portion, each of the first and second housing portions comprising a first end and a second end; an applicator loaded with an oral care material; and the first ends of the first and second housing portions pivotably coupled to one another about a rotational axis so as to be alterable between: (1) a closed state in which the applicator is sealed within an internal cavity of the mechanism; and (2) an open state in which the applicator is exposed.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a perspective view of the oral care instrument of FIG. 1 with the mechanism in the open state;

FIG. 4 is a partial sectional view along the line IV-IV of FIG. 2;

DETAILED DESCRIPTION

Figure 1:
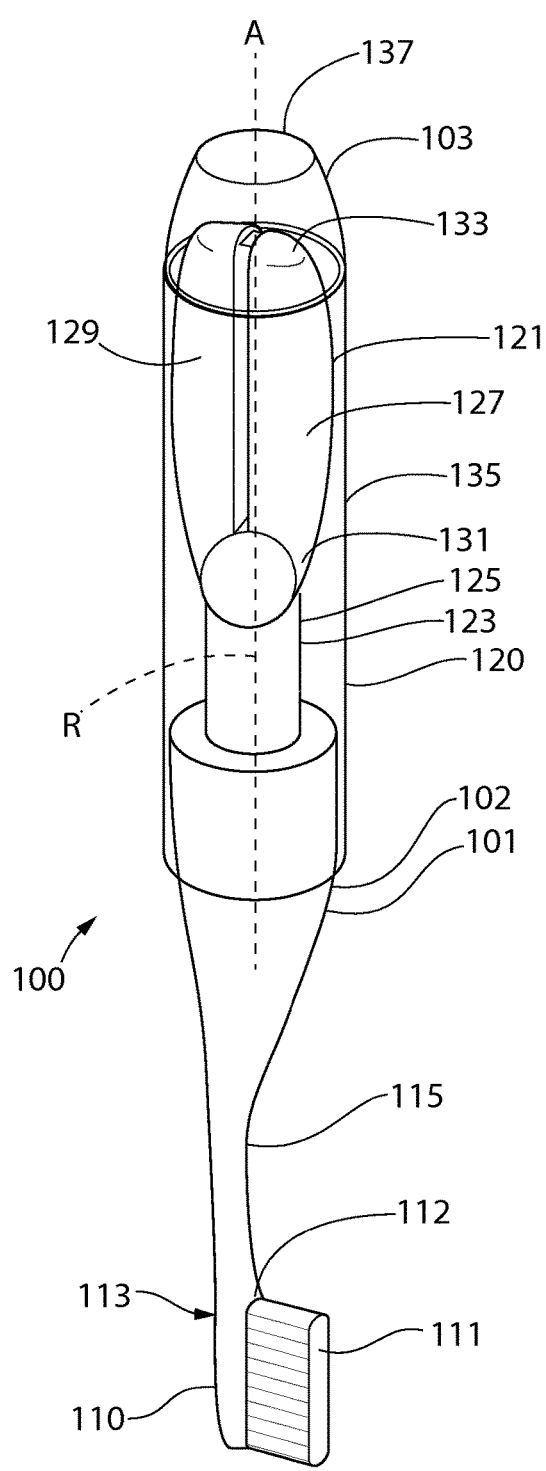
FIG. 1 is a perspective view of a first embodiment of an oral care instrument which includes an applicator positioned in a mechanism in the closed state.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of the exemplary embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top," "bottom," "front" and "rear" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," "secured" and similar refer to a relationship wherein structures are secured or attached to one another either directly or indirectly through intervening structures, as well as both movable or rigid attachments or relationships, unless expressly described otherwise. Moreover, the features and benefits of the invention are described by reference to the exemplary embodiments illustrated herein. Accordingly, the invention expressly should not be limited to such exemplary embodiments, even if indicated as being preferred. The discussion herein describes and illustrates some possible non-limiting combinations of features that may exist alone or in other combinations of features. The scope of the invention is defined by the claims appended hereto.

Referring first to FIG. 1, an oral care implement 100 is illustrated in accordance with an embodiment of the present invention. In this embodiment, the oral care implement 100 is in the form of a manual toothbrush. However, in other embodiments the oral care implement 100 may take on other forms such as being a powered toothbrush, a tongue scraper, a gum and soft tissue cleanser, a water pick, an interdental device, a tooth polisher, a specially designed ansate implement having tooth engaging elements or any other type of implement that is commonly used for oral care. Thus, it is to be understood that the inventive concepts discussed herein can be applied to any type of oral care implement unless a specific type of oral care implement is specified in the claims.

The oral care implement 100 generally includes an elongated body 101 comprising a head 110, a neck 115 and a handle 120. The handle 120 is an elongated structure that extends from a proximal end 103 to a distal end 102 and provides the mechanism by which the user can hold and manipulate the oral care implement 100 during use. In the embodiment shown, the handle 120 is generically depicted without contours or curvature, extending from the proximal end 103 to the distal end 102 along the longitudinal axis A, although such contours or curvatures may be incorporated into the exterior surface of the handle 120 for user comfort. Of course, in other embodiments the handle 120 may take on a wide variety of shapes, contours and configurations, none of which are limiting of the present invention unless so specified in the claims.

In the embodiment shown, the handle 120 is formed of a rigid plastic material, such as for example without limitation polymers and copolymers of ethylene, propylene, butadiene, vinyl compounds and polyesters such as polyethylene terephthalate. Of course, the invention is not to be so limited in all embodiments and the handle 120 may include a resilient material, such as a thermoplastic elastomer, as a grip cover that is molded over portions of or the entirety of the handle 120 to enhance the gripability of the handle 120 during use. For example, portions of the handle 120 that are typically gripped by a user's palm during use may be overmolded with a thermoplastic elastomer or other resilient material to further increase comfort to a user.

The head 110 of the oral care implement 100 is coupled to the handle 120 and comprises a front surface 112 and an opposing rear surface 113. In the embodiment shown, the head 110 is formed integrally with the handle 120 as a single unitary structure using a molding, milling, machining or other suitable process. However, in other embodiments the handle 120 and the head 110 may be formed as separate components which are operably connected at a later stage of the manufacturing process by any suitable technique known in the art, including without limitation thermal or ultrasonic welding, a tight-fit assembly, a coupling sleeve, threaded engagement, adhesion, or fasteners.

The head 110 of the oral care implement 100 is provided at least one oral surface engaging element, which in the embodiment shown is a plurality of tooth cleaning elements 111 extending from the front surface 112. Although in the exemplified embodiment all of the tooth cleaning elements 111 appear to be the same, the invention is not to be so limited in all embodiments. For example, in certain embodiments the tooth cleaning elements 111 include at least one bristle tuft. A bristle tuft is a collection of bristles that are positioned together into a single tuft hole formed on the head 110. Each bristle tuft may include, for example without limitation, only multi-component bristles, a combination of multi-component bristles and single-component (i.e., traditional) bristles, or only single-component bristles. The exact structure, pattern, orientation and material of the tooth cleaning elements 111 is not to be limiting of the present invention unless so specified in the claims.

As used herein, the term "oral surface engaging element" is used in a generic sense to refer to any structure that can be used to clean, polish or wipe the teeth and/or soft oral tissue (e.g. tongue, cheek, gums, etc.) through relative surface contact. Common examples of "oral surface engaging elements" include, without limitation, bristle tufts, filament bristles, fiber bristles, nylon bristles, spiral bristles, rubber bristles, elastomeric protrusions, flexible polymer protrusions, combinations thereof and/or structures containing such materials or combinations. Suitable elastomeric materials include any biocompatible resilient material suitable for uses in an oral hygiene apparatus. To provide optimum comfort as well as cleaning benefits, the elastomeric material of the tooth or soft tissue engaging elements has a hardness property in the range of A8 to A25 Shore hardness. One suitable elastomeric material is styrene-ethylene/butylene-styrene block copolymer (SEBS) manufactured by GLS Corporation. Nevertheless, SEBS material from other manufacturers or other materials within and outside the noted hardness range could be used.

The tooth cleaning elements 111 in the embodiment shown can be connected to the head 110 in any manner known in the art. For example, staples/anchors, in-mold tufting (IMT) or anchor free tufting (AFT) could be used to mount the cleaning elements/tooth engaging elements. In certain embodiments, the invention can be practiced with various combinations of stapled, IMT or AFT bristles. In AFT, a plate or membrane is secured to the brush head such as by ultrasonic welding. The bristles extend through the plate or membrane. The free ends of the bristles on one side of the plate or membrane perform the cleaning function. The ends of the bristles on the other side of the plate or membrane are melted together by heat to be anchored in place. Any suitable form of cleaning elements may be used in the broad practice of this invention. Alternatively, the bristles could be mounted to tuft blocks or sections by extending through suitable openings in the tuft blocks so that the base of the bristles is mounted within or below the tuft block.

In the embodiment shown, the head 110 of the oral care implement 100 includes a plurality of tuft holes (not visible) formed therein. A plurality of tufts of bristles are positioned within and affixed to the head 110 within each of the tuft holes. Each of the tufts of bristles includes a plurality of bristles, which can be single strand bristles, double strand multi-component bristles, triple strand multi-component bristles, etc. or various combinations thereof. Thus, each tuft of bristles may include only single strand bristles, or only double strand multi-component bristles, or only triple strand multi-component bristles, or any combination of single strand bristles, double strand multi-component bristles, and triple strand multi-component bristles. Additionally, a single tuft hole may be filled with an elastomeric cleaning element or any of the other types of cleaning elements noted above.

Although not illustrated herein, in certain embodiments the head 110 may also include an oral surface engaging element coupled to or positioned on the rear surface 113, such as a soft tissue cleanser. An example of a suitable soft tissue cleanser that may be used with the present invention and positioned on the rear surface of the head 110 is disclosed in U.S. Pat. No. 7,143,462, issued Dec. 5, 2006 to the assignee of the present application, the entirety of which is hereby incorporated by reference. In certain other embodiments, the soft tissue cleanser may include protuberances, which can take the form of elongated ridges, nubs, or combinations thereof. Of course, the invention is not to be so limited and in certain embodiments the oral care implement 100 may not include any soft tissue cleanser.

In the embodiment shown, the proximal end 102 of the handle 120 includes a mechanism 121, and the distal end of the handle includes a base portion 123. The mechanism 121 is coupled to a proximal end 125 of the base portion 123, opposite the distal end 102 of the handle 120. In other embodiments, the mechanism 121 may be formed into or on the head 110 or may be a stand-alone device.

The mechanism 121 is formed from a first housing portion 127 and a second housing portion 129. The first and second housing portions 127, 129 each have a first end 131 and a second end 133, and the first ends 131 of the first and second housing portions 127, 129 are pivotably coupled to one another, with the pivotal coupling being about a rotational axis R. In certain embodiments, the rotational axis R is orthogonal to the longitudinal axis A of the handle 120. In FIG. 1, the first and second housing portions 127, 129 are shown in a closed state, in which an enclosure (not shown in FIG. 1) is formed therebetween. In certain embodiments, the first and second housing portions 127, 129 are pivotably coupled to the base portion 123. Alternatively, in certain embodiments, one of the first and second housing portions 127, 129 is non-pivotably coupled to the base portion 123, while the other of the first and second housing portions 127, 129 is pivotably coupled to the base portion 123. And, in certain embodiments, the mechanism 121 may be detachably coupled to the base portion 123.

Figure 2:
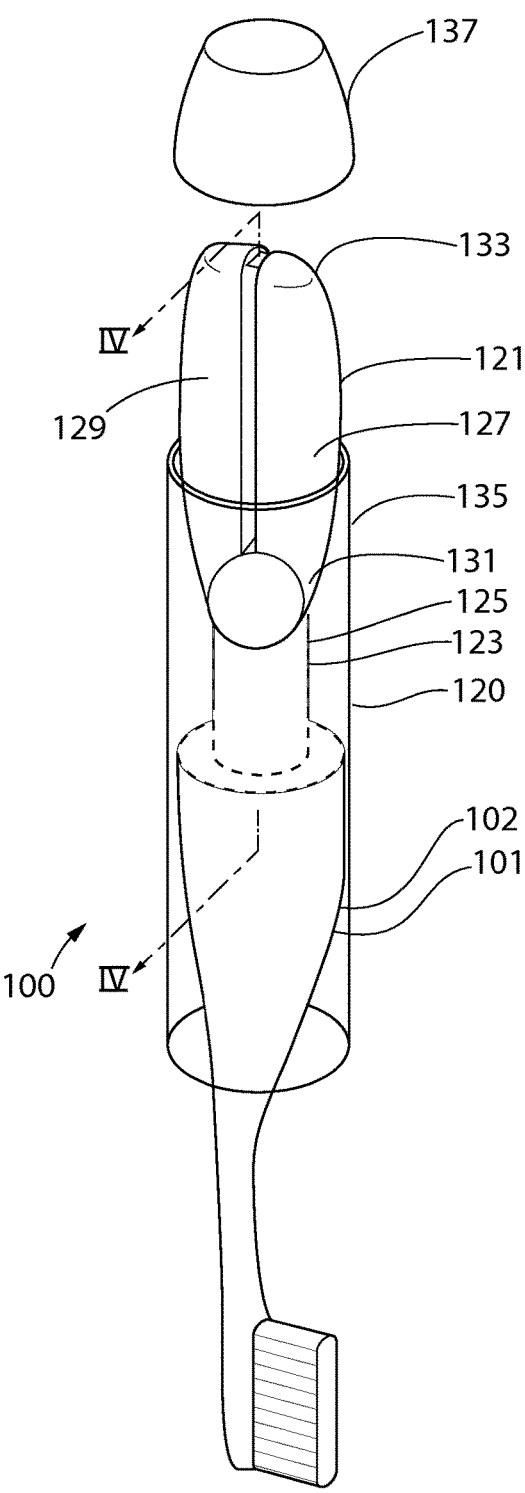
FIG. 2 is a perspective view of the oral care instrument of FIG. 1 with the cap removed from the tubular sheath.

In the embodiment shown, the handle 120 further includes a tubular sheath 135, although the inclusion of the tubular sheath 135 is not intended to be limiting of the present invention unless so specified in the claims. The tubular sheath 135 is slidably disposed over the mechanism 121, the base portion 123, the neck 115, and the head 110, such that the tubular sheath 135 is slidable along a longitudinal axis A. The position of the tubular sheath 135 is alterable between: (1) a first position (shown in FIG. 1) in which the mechanism 121 is disposed in the tubular sheath 135 in the closed state and the head 110 protrudes from a first end of the tubular sheath 135; and (2) a second position (shown in FIG. 3) in which the head 110 is disposed in the tubular sheath 135 and the mechanism 121 protrudes from a second end of the tubular sheath 135. Thus, with the tubular sheath 135 in the first position, the mechanism 121 is maintained in the closed state, and with the tubular sheath 135 in the second position, the mechanism 121 may be in the open state. A cap 137 may threadably engage the tubular sheath 135, when in the first position, to retain the tubular sheath 135 in the first position. In certain embodiments, in moving between the first position and the second position, the tubular sheath 135 may actuate the mechanism 121 from the open state to the closed state upon being translated from the second position to the first position. The process of the cap 137 being removed from the tubular sheath 135 and the tubular sheath 135 being translated from the first position to the second position is illustrated in FIG. 2. During the translation process, once the sliding of the tubular sheath 135 fully exposes the mechanism 121, the mechanism 121 may be actuated from the closed state to the open state. In certain embodiments, actuation of the mechanism 121 from the closed state to the open state occurs automatically following translation of the tubular sheath 135 from the first position to the second position, and in other embodiments the user manually actuates the mechanism 121 from the closed state to the open state occurs automatically following translation of the tubular sheath 135 from the first position to the second position.

In the closed state of the mechanism 121, the first and second housing portions 127, 129 are separated by a first rotational angle, relative to the rotational axis R. In certain embodiments, this first rotational angle is between 0° and 15°. As discussed in more detail below, an applicator loaded with an oral care material may be positioned within the enclosure formed by the first and second housing portions 127, 129 of the mechanism 121.

In certain embodiments, the first and second housing portions 127, 129, when in the closed state, may form a sealed enclosure therebetween to substantially reduce the ingress and egress of fluids and gases. In yet other embodiments, it may be desirable to have an open space formed between the first and second housing portions 127, 129, when in the closed state, with the open space being exposed to external atmosphere to help reduce bacterial and mold growth within the mechanism 121.

Turning to FIG. 3, the first and second housing portions 127, 129 are shown in the open state with the second ends 133 of the first and second housing portions 127, 129 spaced apart from one another, thereby exposing the applicator 137. In this open state, the first and second housing portions 127, 129 are separated by a second rotational angle, relative to the rotational axis R, and this second rotational angle is greater than the first rotational angle, the latter being characteristic of the closed state. In certain embodiments, this second rotational angle is between 30° and 180°. The rotational separation between the second ends 133 of the first and second housing portions 127, 129 creates a gap 139 between the first and second housing portions 127, 129 when in the open state. The applicator 137 has first and second ends 141, each of which is coupled to the first and second housing portions 127, respectively, so that, in the open state, the applicator is suspended in the gap 139 to form a suspension bridge between the first and second housing portions 127, 129. In forming this suspension bridge, a portion of the gap 139 remains between the applicator 137 and the first and second housing portions 127, 129, except at those points where the first and second ends 141 of the applicator 137 are coupled to the first and second housing portions 127, 129, respectively. In being coupled to the first and second housing portions 127, 129 in this manner, the applicator 137 is exposed for direct contact with the oral surface, i.e., one or more parts of a user's mouth, when the mechanism 121 is in the open state. The applicator 137 may be exposed by the open state of the mechanism 121 by other configurations of the mechanism 121, and as such none of the configurations described herein are intended to be limiting of the present invention unless so specified in the claims. In certain embodiments, such as in the embodiment shown in FIGS. 1-5, the applicator 137 is intended to not be removable from the mechanism 121 by the user. In certain embodiments, the manner in which the applicator 137 is positioned within the enclosure formed in the mechanism 121 may make the applicator 137 removable from the mechanism 121 by the user.

The applicator 137 is loaded with an oral care material on at least the surface of the applicator 137 facing away from the first and second housing portions 127, 129. In certain embodiments, the oral care material may be in liquid form. In certain other embodiments, the oral care material may be in a solid, or semi-solid form, to be hydrated by saliva or by dipping in water. In certain embodiments where both a teeth whitening material and a desensitizing material are included, the two materials are preferably in the same form (i.e., a dry state or a wet state) prior to use.

In certain embodiments, solid whitening materials may be employed, and some sutable solid whitening materials include peroxides, metal chlorites, perborates, percarbonates, peroxyacids, persulfates, and combinations thereof. Suitable peroxide compounds include hydrogen peroxide, urea peroxide, calcium peroxide, and mixtures thereof. Suitable metal chlorites include calcium chlorite, barium chlorite, magnesium chlorite, lithium chlorite, sodium chlorite, and potassium chlorite.

In certain embodiments, the desensitizing material may be solid materials, and some suitable desensitizing materials include potassium nitrate, other potassium salts, citric acid, citrates, strontium chloride, sodium fluoride, and stannous fluoride, such as are known in the art.

In still other embodiments, different oral care materials can be utilized with the present invention. Contemplated oral care materials include without limitation, antibacterial agents; oxidative or whitening agents; enamel strengthening or repair agents; tooth erosion preventing agents; tooth sensitivity ingredients; gum health actives; nutritional ingredients; tartar control or anti-stain ingredients; enzymes; sensate ingredients; flavors or flavor ingredients; breath freshening ingredients; oral malodor reducing agents; anti-attachment agents or sealants; diagnostic solutions; occluding agents, dry mouth relief ingredients; catalysts to enhance the activity of any of these agents; colorants or aesthetic ingredients; and combinations thereof. Although in some embodiments the oral care material may be a dentifrice, the oral care material is preferably free of (i.e., is not) dentifrice in some other embodiments. Instead, in such embodiments the oral care material is intended to provide benefits in addition to merely brushing one's teeth. Other suitable oral care materials could include lip balm or other materials that are typically available in a semi-solid state. Furthermore, in still other embodiments the oral care material can be a natural ingredient, such as for example without limitation, lotus seed; lotus flower, bamboo salt; jasmine; corn mint; camellia; aloe; gingko; tea tree oil; xylitol; sea salt; vitamin C; ginger; cactus; baking soda; pine tree salt; green tea; white pearl; black pearl; charcoal powder; nephrite or jade and Ag/Au+.

FIG. 4 shows the mechanism 121 in the closed state. The first and second ends 141 of the applicator 137 each have a retainer 145 affixed thereto, and each of the retainers 145 is seated within the second ends 133 of the first and second housing portions 127, 129. With the mechanism 121, the applicator 137 is positioned with the enclosure formed between the first and second housing portions 127, 129. In certain embodiments, the applicator 137 is in a non-tensioned state. In other embodiments, the applicator 137 may be in a tensioned state. The state of the applicator positioned within the mechanism 121, when the mechanism 121 is in the closed state is not intended to be limiting of the present invention unless so specified in the claims. In the embodiment shown, the handle 120 includes a reservoir 147 for storing an oral care material in liquid form. The reservoir 147 provides the oral care material through a first conduit 149 to a pump 151, which is actuatable by an actuator button 153 located on the base portion 123 of the handle 120. The pump 151 and the actuator button 153, and the functional interaction between the pump 151 and the button 153 may be of any type known to those of skill in the art, and as such the configuration of the pump 151 and the button 153 is not intended to be limiting of the present invention unless so specified in the claims. A second conduit 155 delivers the oral care material from the pump 151 to a nozzle 157, which is located in the second end 133 of one of the first or second housing portions 127, 129. The opening of the nozzle 157 extends into the gap between the first or second housing portions 127, 129 so that, when the mechanism 121 is in the closed state, the oral care material may be delivered into the enclosure 159 formed between the first and second housing portions 127, 129, thereby enabling the applicator 137 to be re-loaded with oral care material from the reservoir 147.

Figure 5:
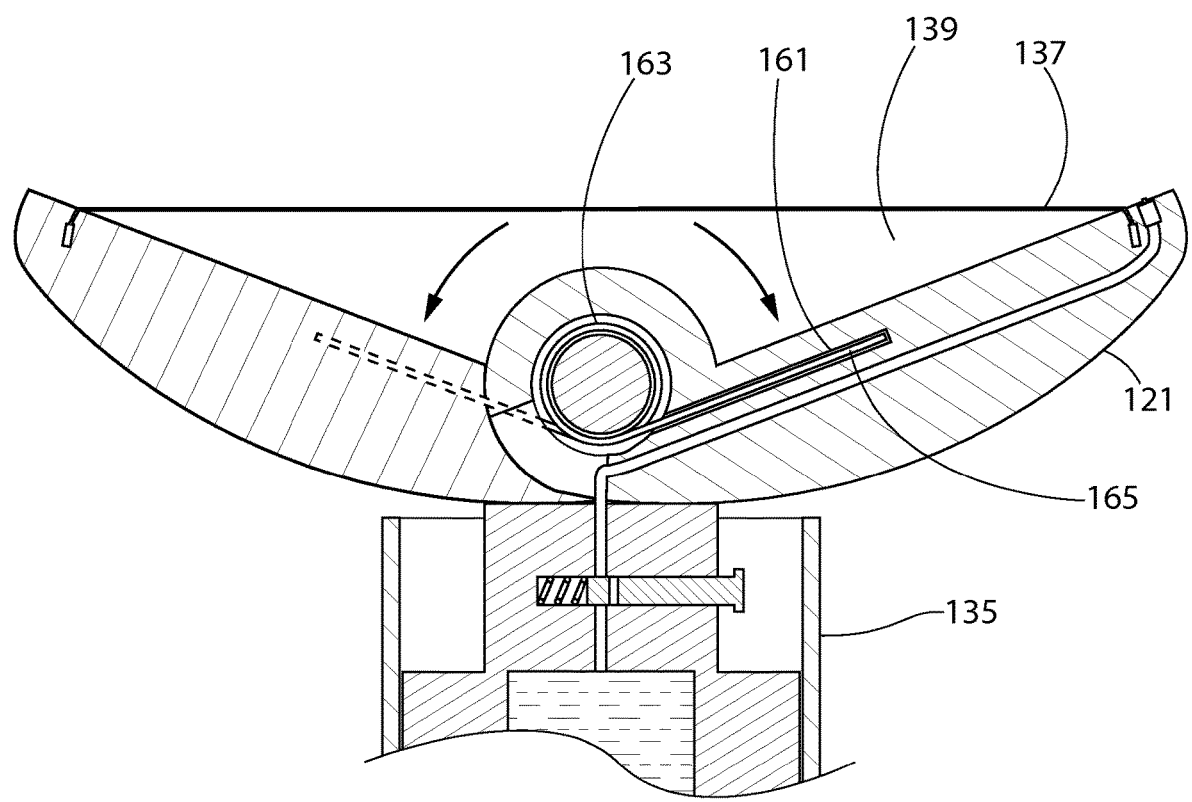
FIG. 5 is a partial sectional view along the line V-V of FIG. 3.

A resilient element, in the form of a spring 161 in the embodiment shown in FIGS. 4 and 5, is positioned within the mechanism 121 to bias the first and second housing portions 127, 129 of the mechanism 121 into the open state. The spring 161 is positioned with coils 163 wrapped around the rotational axis R and first and second arms 165, each of the first and second arms 165 extending into one of the first and second housing portions 127, 129, respectively. In FIG. 4, the tubular sheath 135 is shown partially in place over the mechanism 121, which keeps the mechanism 121 in the closed state. In comparison, FIG. 5 shows the mechanism 121 without the sheath 135 in place over the mechanism 121, so that the spring 161 biases the mechanism 121 into the open state. In this open state, the applicator 137 is exposed for direct contact with the oral surface, i.e., one or more parts of a user's mouth, and a portion of the gap 139 remains between the applicator 137, which forms a suspension bridge, and the first and second housing portions 127, 129. In this embodiment, and in certain other embodiments, the applicator 137 is held under tension when the mechanism 121 is in the open state due to the bias imparted on the first and second housing portions 127, 129 by the spring 163. In certain embodiments, the shape of the outer surface of the first and second housing portions 127, 129 enable the sheath 135 to be moved toward the proximate end of the handle 120 to actuate the mechanism 121 from the open state to the closed state.

Figure 6:
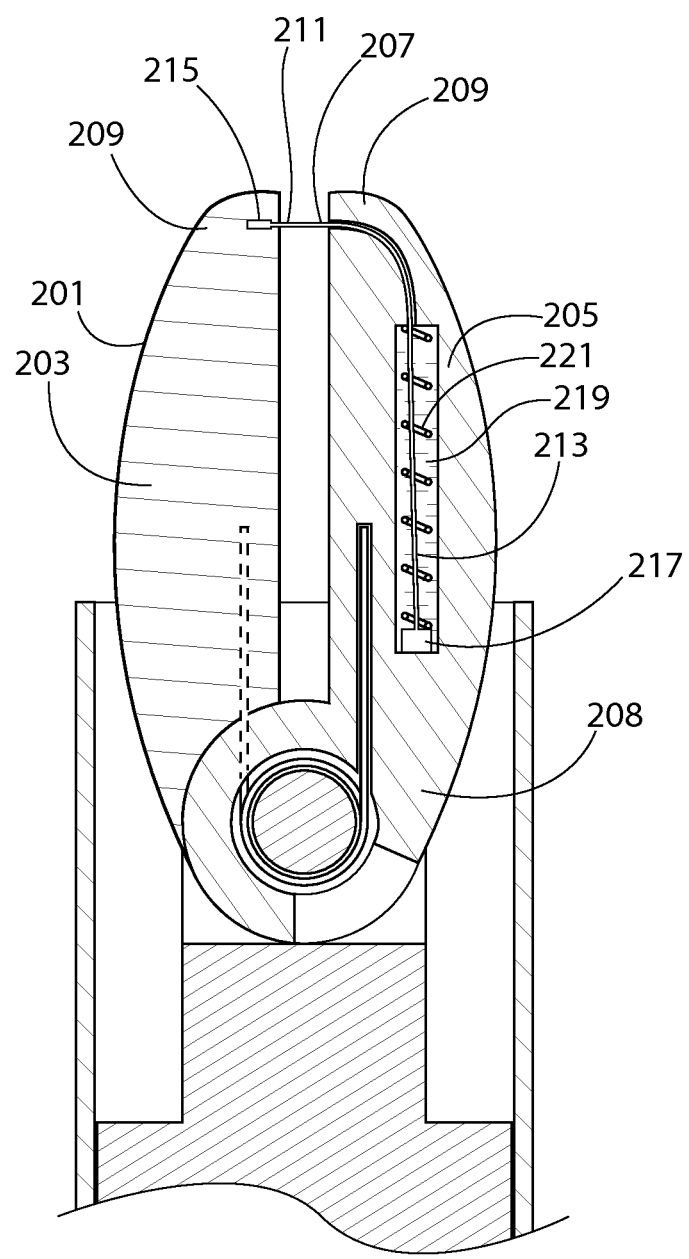
FIG. 6 is a partial sectional view of a second embodiment of an oral care instrument which includes an applicator positioned in a mechanism in the closed state.

In the embodiment shown in FIG. 6, the mechanism 201 includes first and second housing portions 203, 205, and the applicator 207 is coupled to the second ends 209 of each of the first and second housing portions 203, 205. The applicator 207 includes first and second ends 211, 213, with both the first and second ends 211, 213 having retainers 215, 217 affixed thereto. The first retainer 215 affixed to the first end 211 is seated within the second end 209 of the first housing portion 203. The second retainer 217 affixed to the second end 213 is retained within a reservoir 219 for oral care material located within the second housing portion 205.

Figure 7:
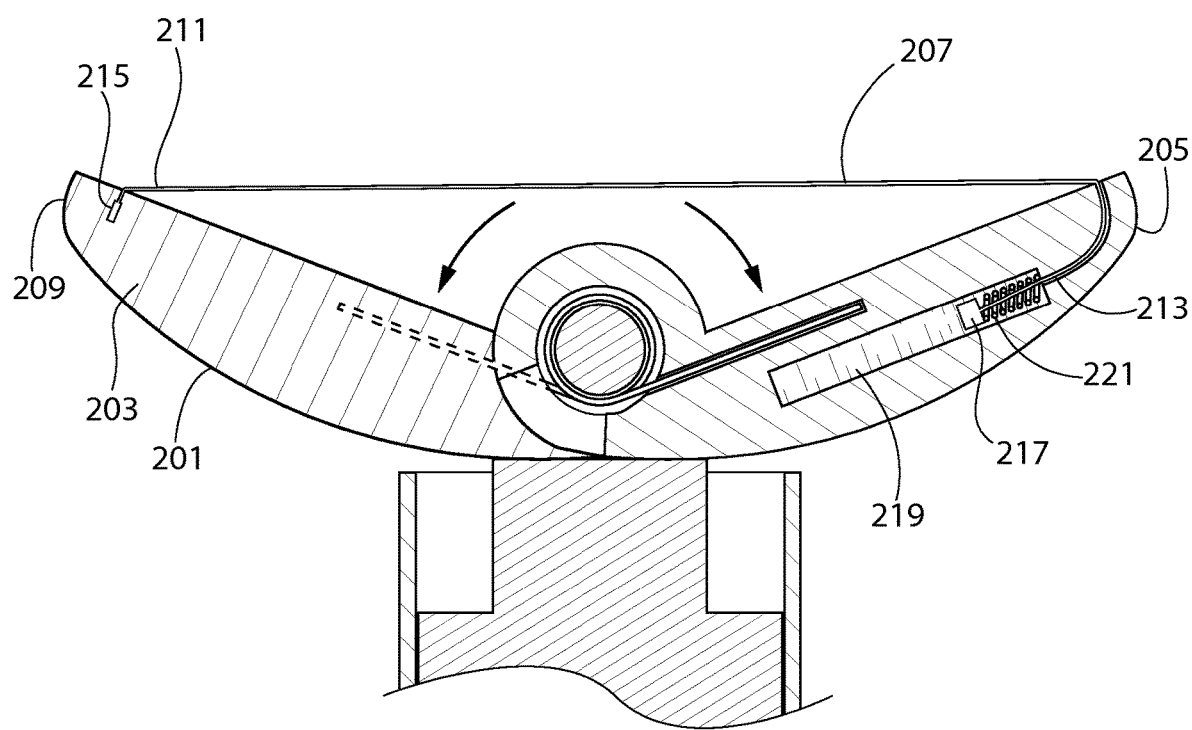
FIG. 7 is a partial sectional view of the oral care instrument of FIG. 6 with the mechanism in the open state.

Within the reservoir, a resilient member, shown as a spring 221, biases the second retainer 217, and thus the second end 213 of the applicator 207, toward the first end 208 of the second housing portion 205. Thus, when the mechanism 201 is in the closed state, the applicator 207 is drawn into the reservoir 219, and as is shown in FIG. 7, when the mechanism 201 is in the open state, the applicator 207 is drawn out of the reservoir 219. In each instance, a substantial length of the applicator 207 is drawn through the reservoir 219 and drawn through the oral care material within the reservoir 219 to re-load the applicator 207 with oral care material. By this action, the mechanism 201 is configured to automatically apply the oral care material from the reservoir 219 to the applicator 207 as the mechanism is altered from the closed state to the open state, and from the open state to the closed state.

Figure 8:
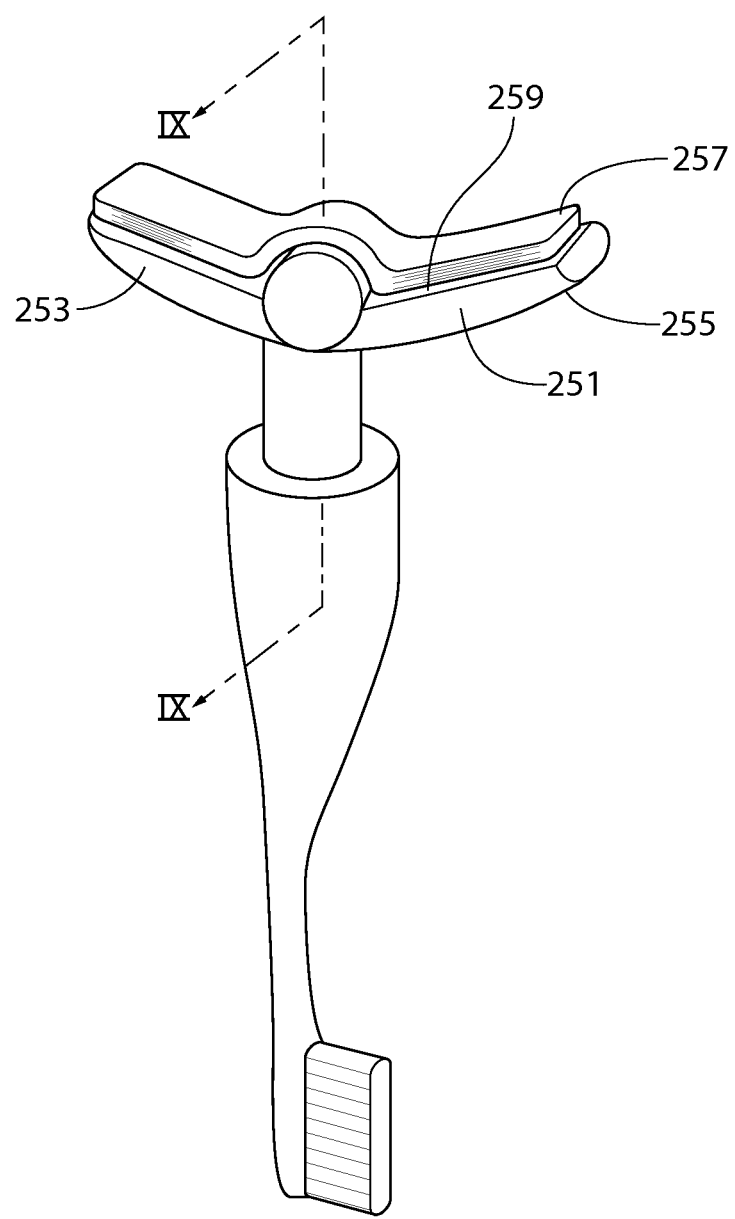
FIG. 8 is a perspective view of a third embodiment of an oral care instrument which includes an applicator positioned in a mechanism in the open state.

FIG. 8 shows an embodiment in which the mechanism 251 includes first and second housing portions 253, 255, and when the mechanism 251 is in the open state, the applicator 257 extends along the inner surfaces 259 of the first and second housing portions 253, 255. In the embodiment shown, the applicator 257 is a pad which is in fluid contact with a reservoir of oral care material within each of the first and second housing portions 253, 255. Thus, when the applicator 257 is in contact with the user's teeth, the applicator 257 dispenses or otherwise applies the oral care material to the user's upper and lower teeth (and specifically to the facial surfaces of the user's upper and lower teeth, which may be only the labial surfaces or the combination of the labial and buccal surfaces of the user's upper and lower teeth).

Figure 9:
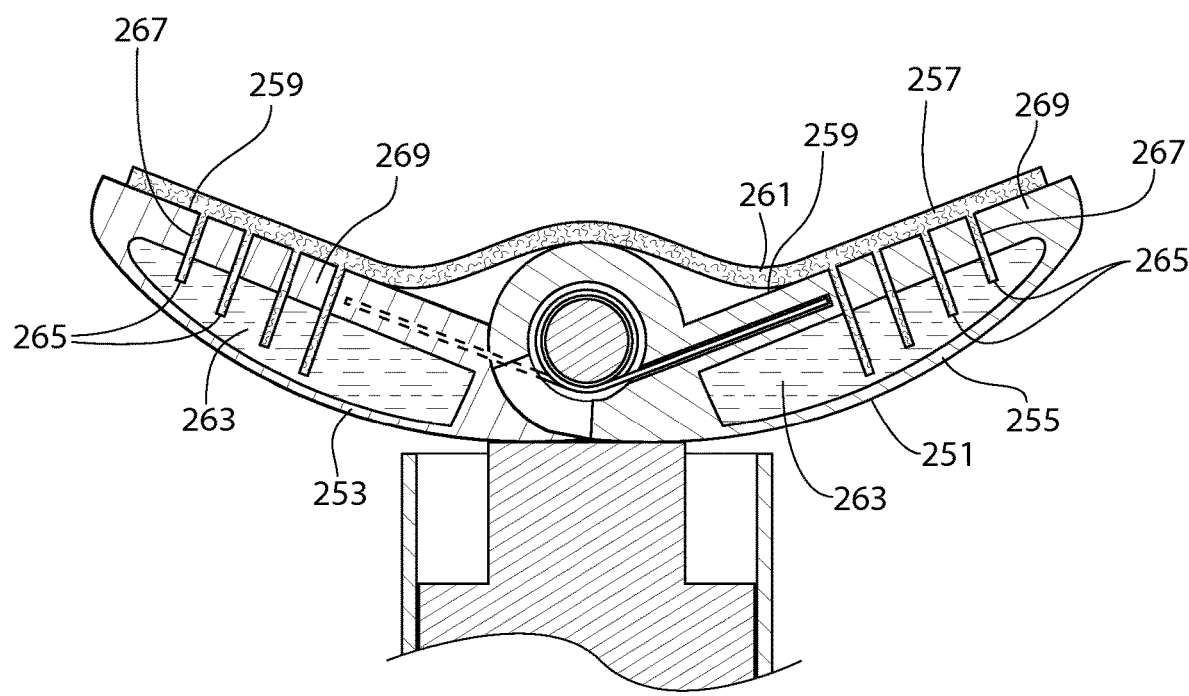
FIG. 9 is a partial sectional view of the oral care instrument of FIG. 8.

The mechanism 251 is shown in greater detail in FIG. 9. In the embodiment shown, the applicator 257 includes a pad 261 of a capillary material. The capillary material of the pad 261 may be any material that is capable of wicking the oral care material from the reservoirs 263 and into the pad 261 via capillary action, such as for example without limitation a porous plastic, a ceramic, a foam, a sponge, a cloth, synthetic mesh, combinations thereof, or the like. The applicator 257 also includes one or more wicking members 265 (only some of which are numbered in the drawings to avoid clutter) fluidly couple the pad 261 to the reservoirs 263. Specifically, in the embodiment shown, a plurality of the wicking members 265 extend from the pad 261, through passageways 267 formed into the inner surface walls 269 of each of the first and second housing portions 253, 255, and into the oral care material contained within each of the reservoirs 263, so that the oral care material can be wicked up to the pad 261 via the wicking members 265. Thus, the wicking members 265 may also be formed of one of the capillary materials noted above. The wicking members 265 and the pad 261 may be formed of the same capillary material or different capillary materials as desired. In certain embodiments the wicking members 265 may be formed integrally with the pad 261, although such is not required.

Of course, the invention is not to be limited to the structural arrangement depicted in the drawings in all embodiments. In certain other embodiments the pad 261 of the applicator 257 may be in direct contact with the reservoirs 263 of oral care material. Specifically, in such embodiments the inner surface walls 269 of each of the first and second housing portions 253, 255 may be omitted so that a bottom surface of the pad 261 is in direct contact with the reservoirs 263 of oral care material. In such embodiments, the wicking members 265 may be omitted because the reservoirs 263 of oral care material will be wicked into the pad 261 due to the direct contact between the pad 261 and the oral care material in the reservoirs.

Furthermore, although the applicator 257 is described herein as included the pad 261 formed of a capillary material, the invention is not to be so limited in all embodiments. In certain other embodiments the applicator 257 may include a pad formed of a thermoplastic elastomer that is positioned atop of the inner surface walls 269 of each of the first and second housing portions 253, 255 and such pad may include openings formed therethrough. In such an embodiment, the oral care material may be dispensed through the applicator 257 by a user depressing/squeezing the outer surfaces of each of the first and second housing portions 253, 255, or by depressing or otherwise actuating an actuator, to force the oral care material to be dispensed from the reservoirs 263 to the applicator 257.

Figure 10:
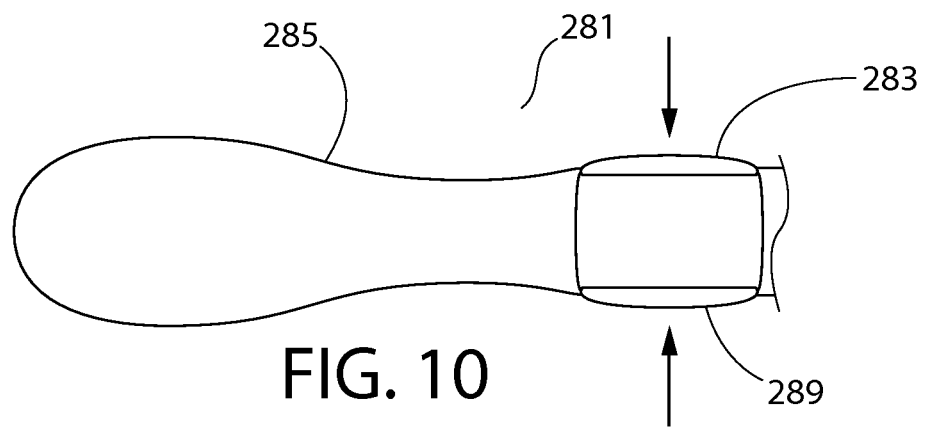
FIG. 10 is partial top elevation view of a fourth embodiment of an oral care instrument which includes an oral care applicator stored in a mechanism.

FIG. 10 illustrates a mechanism 281 which includes a locking element 283 to maintain the first and second housing portions 285 in the closed state. This locking element 283 may be included as a replacement for, or in addition to, a tubular sheath to maintain the mechanism 281 in the closed state, and it may be actuated by squeezing outer surfaces 289 of the mechanism in the vicinity of the rotational axis R. The locking element 283 may be internal to the mechanism 281, serving to engage one or both of the first and second housing portions 285 to prevent them from transitioning from the closed state to the open state. Specifically, the locking element 283 may engage one or both of the first and second housing portions 285, when in the closed state, to prevent rotation of the engaged one or both of the first and second housing portions 285 about the rotational axis R. In addition, the locking element 283 may be configured to automatically re-engage the one or both of the first and second housing portions 285 upon transition of the first and second housing portions 285 from the open state to the closed state.

Figure 11:
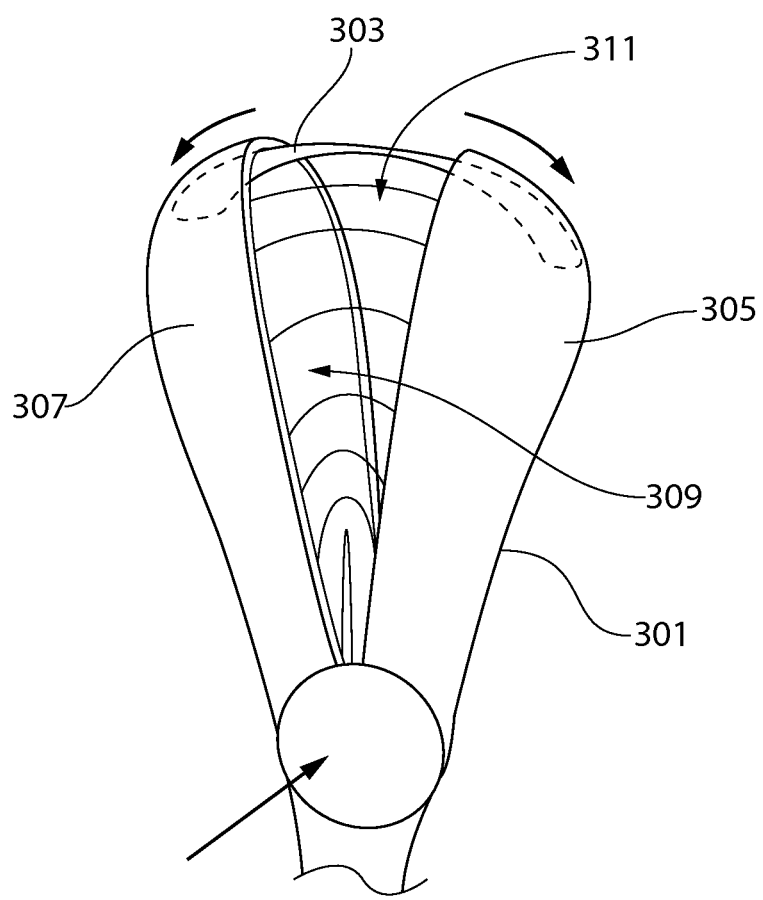
FIG. 11 is partial perspective view of a fifth embodiment of an oral care instrument which includes an oral care applicator stored in a mechanism.

A mechanism 301 which presents an applicator 303 to the user for removal is shown in FIG. 11. In this embodiment, the mechanism 301 includes first and second housing portions 305, 307 which form an enclosure 309 when in the closed state, and an applicator stack 311 is positioned within the enclosure 309. When the mechanism 301 transitions from the closed state to the open state, the top-most applicator 303 in the applicator stack 311 is presented to the user for removal from the enclosure. In certain embodiments, the mechanism 301 may be actuated manually, such as by inclusion of a locking element as shown and described in FIG. 10.

Figure 12:
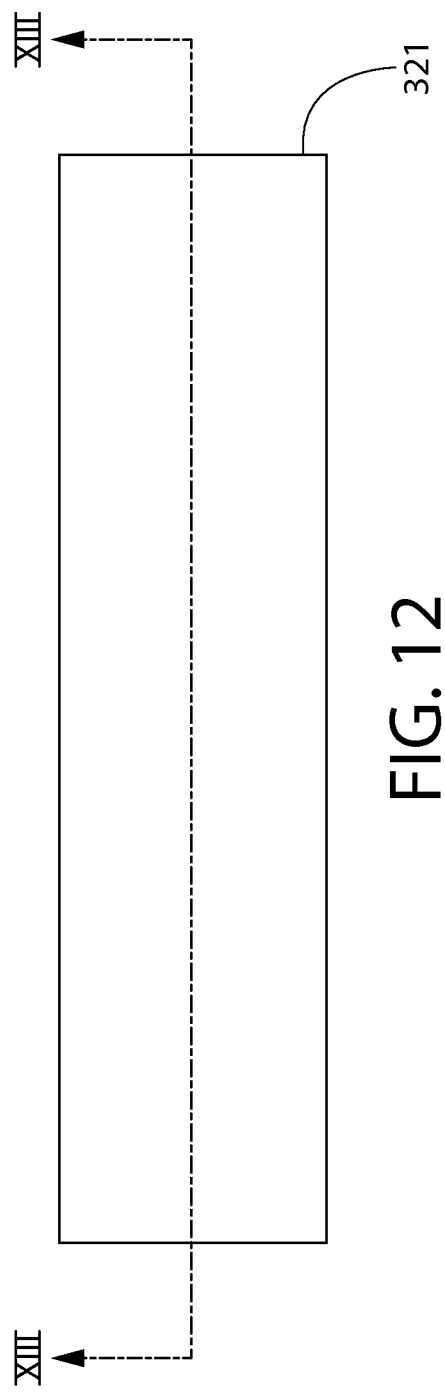
FIG. 12 is a top plan view of an embodiment of a sealed package containing an oral care strip.
Figure 13:
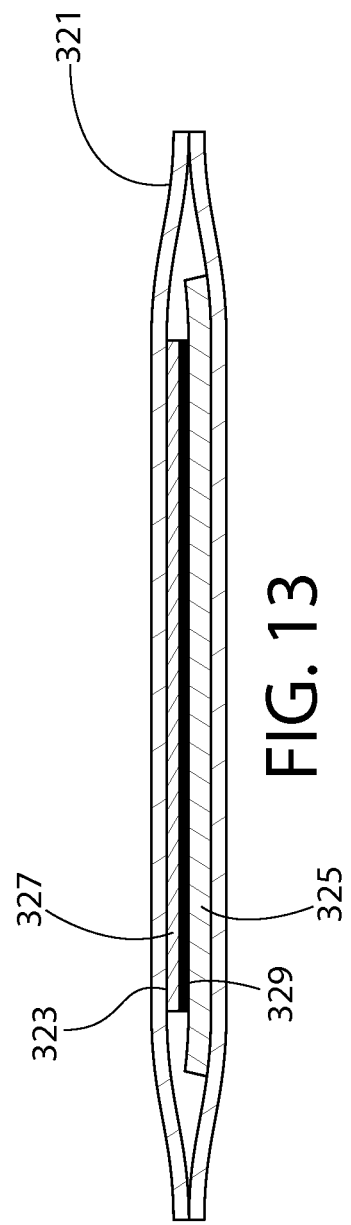
FIG. 13 is a sectional view of the sealed package along the line IV-IV of FIG. 3.

In certain embodiments, the mechanism 301 may have two open states, a first open state for dispensing the applicators 303, in which the second rotational angle is between about 30° and 60°, and a second open state in which the second rotational angle is between about 120° and 180°. The second open state may be included so that the applicator stack 311 may be refilled once all the applicators 303 in a previous applicator stack 311 have been consumed by the user. In certain embodiments, a sealed package 321, such as is shown in FIGS. 12 and 13 may contain the applicator 303, and the applicators 303 may be in the form of an oral care strips 323. In certain embodiments, the applicators are not contained in sealed packages, instead the applicators are positioned within the enclosure 309 without being sealed or wrapped.

In the embodiment shown, the sealed package 321 is rectangular in shape, although the exact geometry of the sealed package 321 is not to be limiting of the present invention unless so specified in the claims. In certain embodiments, the sealed package 321 is hermetically sealed against incursion from external fluids and gases. The oral care strips 323 include a substrate layer 325 to which a film 327 is affixed, with an oral care material 329 disposed between the film 327 and the substrate layer 325. As is known in the art, the oral care material 329 may serve as an adhesive between the film 327 and the substrate layer 325. In certain embodiments, the adhesive (or oral care material 329) used to affix the film 327 to the substrate layer 325 also functions as an adhesive to keep the film on a user's teeth when the film is placed thereon. In certain embodiments, an inner surface of the sealed package 321 may act as the substrate layer 325, with the side of the film 327 having the oral care material 133 facing the inner surface of the sealed package 321. In certain embodiments, the oral care strips 323 may not include the oral care material 329, with the user adding a desired oral care material after the oral care strip 129 is removed from the internal cavity. Therefore, the inclusion of the oral care material on the oral care strip is not to be limiting of the present invention unless so specified in the claims.

The oral care strips 323 may be removed from the sealed package 321 by tearing or otherwise separating one end 137 of the sealed package 321 from a larger portion 139 of the sealed package 321. The separation may be facilitated by a perforation, in the sealed package 321, the choice of material for the sealed package 321, or by any suitable technique known in the art that enables a user to access the oral care strips 323 within the sealed package 321.

The film is formed to have a width dimension suitable to cover a row of teeth (upper or lower). Therefore, the oral care strip may be applied to the upper set of teeth, or to the lower set of teeth either separately or simultaneously. The length dimension of the film is determined by the amount of coverage desired. In this regard, the number of teeth to which it is desired to apply the oral care material will determine the dimensions of the oral care strip. For instance, it may be desired to only apply a teeth whitening material to the front teeth, which are most easily seen by others. Accordingly, the length of a whitening strip can be reduced in this case, as compared to the case where it is desired to whiten all of the teeth. The duration of application of whitening strip to the teeth will depend upon the type and concentration of the whitening agent, as well as the type and intensity of stain.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. An oral care system comprising:
    a handle comprising a proximal end and a distal end;
    a head coupled to a distal end of the handle, the head comprising at least one oral surface engaging element; and
    the handle comprising:
        a first housing portion and a second housing portion, each of the first and second housing portions coupled to the proximal end of the handle, the first and second housing portions each comprising a first end and a second end, where the first ends of the first and second housing portions are pivotably coupled to one another via a biasing element;
        an applicator loaded with an oral care material;
        the first ends of the first and second housing portions are pivotably coupled to one another about a rotational axis so as to be alterable between: (1) a closed state in which the first and second housing portions form an enclosure that contains the applicator; and (2) an open state in which the second ends of the first and second housing portions are spaced from one another and the applicator is exposed;
        a reservoir provided in an intermediate portion of the handle located between the proximal and distal ends, the reservoir containing the oral care material;
        a conduit extending from the reservoir through one of the first and second housing portions, the conduit having an inlet in fluid communication with the reservoir, an outlet at a second end of the one of the first and second housings adjacent the applicator; and
        a dispensing means disposed between the inlet and the outlet, wherein the dispensing means is configured to dispense the liquid oral care material from the reservoir through the conduit and onto the applicator.

2. The oral care system according to claim 1 wherein the second ends of the first and second housing portions are separated by a first rotational angle in the closed state and a second rotational angle in the open state, wherein the second rotational angle is greater than the first rotational angle.

3. The oral care system according to claim 1 wherein the handle extends from the proximal end to the distal end along a longitudinal axis; and wherein the rotational axis is orthogonal to the longitudinal axis.

4. The oral care system according to claim 1 wherein the handle comprises a base portion comprising the distal end of the handle, the first and second housing portions coupled to a proximal end of the base portion that is opposite the distal end of the handle.

5. The oral care system according to claim 4 wherein the first and second housing portions are detachably coupled to the base portion.

6. The oral care system according to claim 1 wherein a gap exists between the first and second housing portions in the open state; and wherein the applicator has a first end coupled to the first housing portion and a second end coupled to the second housing portion so that, in the open state, the applicator is suspended in the gap to form a suspension bridge between the first and second housing portions.

7. The oral care system according to claim 6 wherein the applicator is under tension in the open state.

8. The oral care system according to claim 1 wherein the applicator is re-loaded with the oral care material from the reservoir in the closed state; and the applicator is exposed for direct contact with an oral surface in the open state.

9. The oral care system according to claim 1 wherein the handle further comprises a tubular sheath that is alterable between: (1) a first position in which the first and second housing portions are disposed in the tubular sheath in the closed state and the head protrudes from a first end of the tubular sheath; and (2) a second position in which the head is disposed in the tubular sheath and the first and second housing portions protrude from a second end of the tubular sheath.

10. The oral care system according to claim 9 wherein the tubular sheath is configured to actuate the mechanism from the open state to the closed state upon being translated from the second position to the first position.

11. The oral care system according to claim 1 wherein the first and second housing portions form a sealed cavity in the closed state, the applicator disposed within the sealed cavity.

12. The oral care system of claim 1 wherein the applicator is a planar applicator strip.

13. The oral care system of claim 1 wherein the applicator has a first end fixed to the second end of the first housing portion and a second end fixed to the second end of the second housing portion.

14. The oral care system of claim 1 wherein the applicator has a first side, an opposite second side, a first edge extending from the first side to the second side, a second edge extending from the first side to the second side, the second edge opposite the first edge, a thickness measured between the first and second sides, and a width measured from the first edge to the second edge, the width being greater than the thickness.

15. An oral care system comprising:
a handle comprising a proximal end and a distal end;
a reservoir containing an oral care material provided in a portion of the handle;
a tubular sheath coupled to the handle;
a head coupled to a distal end of the handle, the head comprising at least one oral surface engaging element;
a first housing portion and a second housing portion coupled to the proximal end of the handle, each of the first and second housing portions comprising a first end and a second end, where the first ends of the first and second housing portions are pivotably coupled to one another via a biasing element; and
a planar applicator strip loaded with the oral care material, the applicator strip having opposing ends, where one of the ends is fixed to the second end of the first housing portion and the other one of the ends is fixed to the second end of the second housing portion;
the first ends of the first and second housing portions are pivotably coupled to one another such that the first and second housing portions pivot between: (1) a closed state in which the first and second housing portions form an enclosure that contains the applicator; and (2) an open state in which the second ends of the first and second housing portions are spaced from one another and the applicator is exposed;
wherein the tubular sheath is slidable between: (1) a first position in which the first and second housing portions are completely enclosed in the tubular sheath in the closed state and (2) a second position in which the first and second housing portions protrude from the tubular sheath and are in the open state.

* * * * *